US008255468B2

(12) United States Patent
Vitaldevara et al.

(10) Patent No.: US 8,255,468 B2
(45) Date of Patent: Aug. 28, 2012

(54) EMAIL MANAGEMENT BASED ON USER BEHAVIOR (75) Inventors: Krishna C. Vitaldevara, Fremont, CA (US); Eliot C. Gillum, Mountain View, CA (US); Jason D. Walter, San Jose, CA (US); Mehrdad Bidgoli, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 12/369,724

(22) Filed: Feb. 11, 2009

(65) Prior Publication Data
US 2010/0205259 A1    Aug. 12, 2010

(51) Int. Cl.
*G06F 15/16* (2006.01)
(52) U.S. Cl. ........................................ 709/206; 709/207
(58) Field of Classification Search .................. 709/206, 709/207
See application file for complete search history.

(56) References Cited

U.S. PATENT DOCUMENTS

| 7,127,680 | B2 | 10/2006 | Pang |
| 7,457,844 | B2 | 11/2008 | Miller et al. |
| 7,620,690 | B1 * | 11/2009 | Castelli ........................ 709/206 |
| 2004/0054741 | A1 | 3/2004 | Weatherby et al. |
| 2004/0177110 | A1 * | 9/2004 | Rounthwaite et al. ........ 709/202 |
| 2005/0228899 | A1 | 10/2005 | Wendkos et al. |
| 2006/0271631 | A1 * | 11/2006 | Qureshi et al. ................. 709/206 |
| 2007/0208856 | A1 * | 9/2007 | Rounthwaite et al. ........ 709/225 |
| 2008/0147808 | A1 | 6/2008 | Pang |
| 2008/0168145 | A1 * | 7/2008 | Wilson .......................... 709/206 |
| 2008/0256210 | A1 | 10/2008 | Malik |
| 2008/0294730 | A1 | 11/2008 | Oral et al. |
| 2010/0115040 | A1 * | 5/2010 | Sargent et al. ................. 709/206 |

OTHER PUBLICATIONS

Junkmail Features for Outlook, Thunderbird, and Squirrel Mail (Webmail), http://aco.uwaterloo.ca/lunchSessions/ACOLunchSessionW08/FilteringJunkMail.pdf.
Pablo Martinez, Thwarting Spam with Windows Mail's Junk Filter, article, Apr. 2007, http://e-articles.info/e/a/title/Thwarting-Spam-with-Windows-Mail%060s-Junk-Filter/.

* cited by examiner

*Primary Examiner* — Patrice Winder
*Assistant Examiner* — Tauqir Hussain
(74) *Attorney, Agent, or Firm* — Vierra Magen Marcus & DeNiro LLP (57) ABSTRACT Methods for assisting email users manage email messages received in an email account. An event is triggered by an action performed by an email user with respect to an email message in an email account. The event identifies an entity associated with the email message (e.g., sender address, domain, keyword, etc.). A determination is made whether to assist the user manage their email based on a heuristic. The heuristic assigns weights based on prior events associated with the same entity to determine whether the user is interested in receiving emails from the sender. Based on the heuristics, the method may add the sender to the user's block-list or unsubscribe the user from a mailing list.

10 Claims, 10 Drawing Sheets

For Each Event

Determine Assistance

-If prior email has been unsubscribed, assign weight based on number of unsubscribed emails and number of days since last unsubscribe request         -If prior email has been marked as Junk or placed in Junk folder, assign weight based on number of junked emails         -If prior email has been deleted, assign weight based on number of deleted emails         -If prior email has been read, assign weight based on number of read emails         -If prior email has been rescued, assign weight based on number of rescued emails         -Assign weight based on number of prior emails replied to         -Assign weight based on number of prior emails that have been forwarded     -If Assistance greater than a predetermined weight, determine action End For

Microsoft Mail Internet Headers Version 2.0
Received: from ct.email-domain.com ([81.91.104.40]) by mail.example.com with Microsoft SMTPSVC(6.0.3790.3959);
    Tue, 13 Jan 2009 08:15:32 -0800
From: "Charles Tyrwhitt" <offers@replies.charlestyrwhitt.co.uk>
To: joe@example.com
Subject: Final Reductions - Shirts from $37.50
Date: Tue, 13 Jan 2009 15:59:25 +0000
MIME-Version: 1.0
Content-Type: multipart/alternative;
boundary="MIMEBoundary1cbda9f127dbc7babe1a38c7f2a7b572"
List-Unsubscribe: <mailto:address@ct.email-domain.com>
Message-ID: <LYRIS-14461203-941290-2009.01.13-15.59.27--joe#example.com@ct.email-domain.com>
Return-Path: bounce-941290-14461203@ct.email-domain.com
X-OriginalArrivalTime: 13 Jan 2009 16:15:32.0321 (UTC)
FILETIME=[2897A510:01C9759A]
…..

EMAIL MANAGEMENT BASED ON USER BEHAVIOR

BACKGROUND

Unwanted mail (e.g., spam, junk mail, etc.) is classified as gray mail. Gray mail by definition is mail that users disagree on whether they would like to receive or not receive. As an example, some users may consider frequent sales communication from a certain store as spam while others may want to receive these mailings. To assist user's avoid gray mail, several web-based email services expose an unsubscribe user interface (UI) upon detecting a list-unsubscribe header in the email. The UI allows the user to automatically generate an unsubscribe request to the sender rather than having to search through the email itself to locate the unsubscribe request contained in the body of the email message. However, some senders may not honor an unsubscribe request submitted by a user and hence diminish the user trust in the unsubscribe feature.

Because of this, many users select the "report spam" button as an alternative to using the unsubscribe link UI provided by their email service. Users may also prefer to select the "report spam" button because they believe that using the unsubscribe link UI confirms the existence of an email address with an active user behind it, leading to more "spam." Another reason a user may select the button is an inability to find the unsubscribe link. Senders often bury the unsubscribe link towards the end of the email message.

Selecting a "report spam" button also does not solve all of the user's problems. A user often receives the same unwanted email message over and over again despite reporting it as spam. The spam block feature of the user's email account cannot add every sender reported by the user to the user's block-list for several reasons. First, block-lists could get full very fast as spammers very easily can change their FROM: address. Second, false positives (unintentionally blocking a sender) associated with users sometimes abusing the button or not liking the content of the specific mail but still wanting to receive future mailings from that sender.

SUMMARY

One aspect of the present technology is to assist email users manage their email account. A computer-implemented method receives a user event triggered by an action performed by an email user on an email message. The user event includes, among other things, the email address of the sender. The method determines whether to assist the email user manage their email messages based on a heuristic. If an assist weight exceeds a predetermined value, the technology performs an action on behalf of the email user. In one embodiment, the action comprises adding the sender's email address to the user's block-list. Alternatively, if the email includes a list-unsubscribe header, the action may comprise unsubscribing the user from a mailing list. The action may be implemented without obtaining prior approval from the user. Alternatively, the user may be prompted for permission to implement the action before performing the action.

The heuristic uses numerous criteria to determine whether to assist the user manage their email messages. Each criteria assigns a weight based on prior user events associated with the same sender. One criteria is a number of email messages from the sender that have been previously junked by the user. Other criteria include a number of email messages from the sender that the user has previously submitted an unsubscribe request; a number of email messages from the sender that have been previously deleted by the user; a number of email messages from the sender that have been previously rescued by the user; a number of email messages from the sender that have been previously marked as a phishing scam by the user; a number of email messages from the sender that have been replied to by the user; a number of email messages from the sender that have been forwarded by the user; and a number of email messages from the sender that have been read by the user.

The technology also attempts to resolve conflicts between the user's current action and the user's past actions performed on emails associated with the same sender. In one instance, the received event may have been triggered by an unsubscribe request. Upon receiving the event, the technology looks at the prior events associated with the sender in an attempt to determine the user's preference for receiving emails from the sender. For example, prior events may indicate that the user has been reading emails from the sender and has marked one email from the sender as not junk. Reading emails and marking an email as not junk indicates that the user is interested in receiving emails from the sender. In contrast, the unsubscribe request indicates that the user is not interested in receiving emails from the sender. In this case, the technology will prompt the user and ask the user to confirm whether they want the technology to submit the unsubscribe request. Alternatively, the technology may choose to ignore the user's current request to unsubscribe from the mailing list (and subsequent requests) without prompting the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology described herein assists email users manage email messages received in their email account. Email users constantly interact with their mail account (e.g., read email, delete email, etc.). Data associated with the user's actions are stored in a usable format. Based on an event, heuristics are implemented to alter the user's experience with respect to managing the responsible entity (e.g., email address, domain, webpage, etc.), and particularly in the case of entities associated with gray mailer and spammers. The technology provides assistance to a user by adding an entity to the user's block-list (with or without notification), requesting permission from the user to place an entity on their block-list and/or preventing the user from submitting an unsubscribe request.

Figure 1:
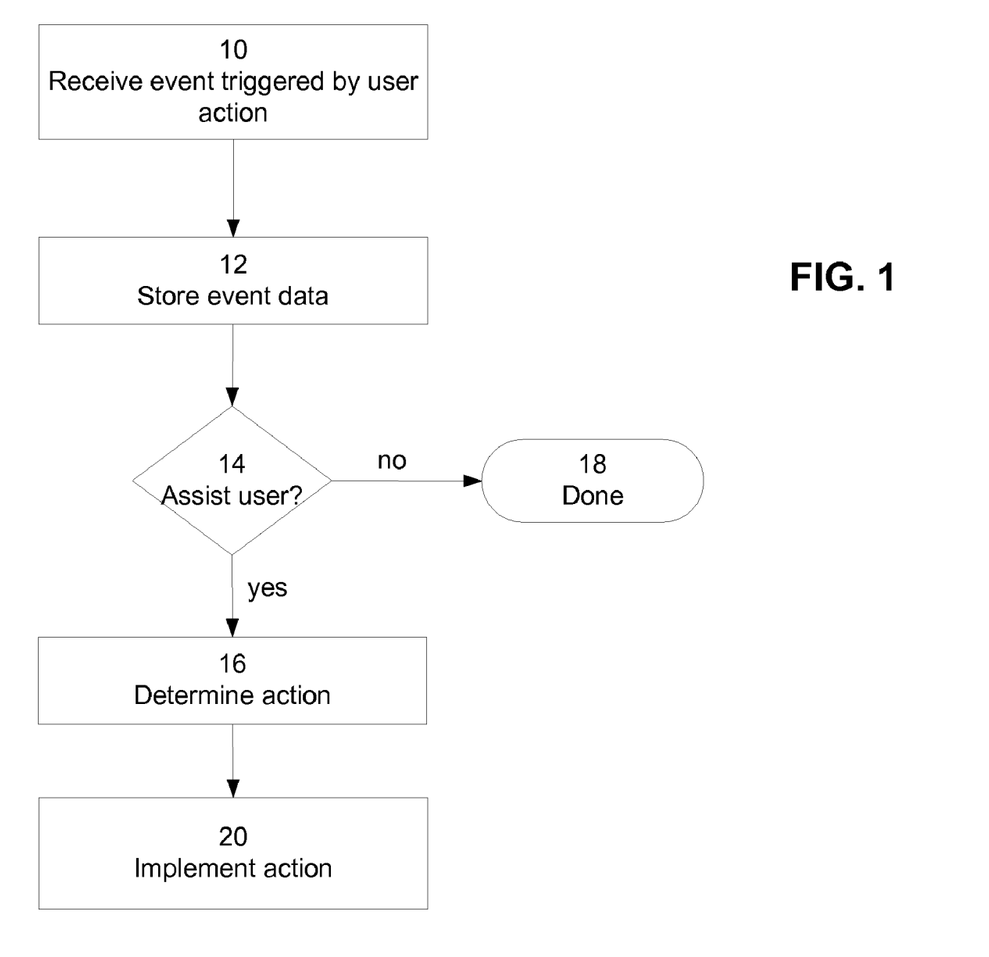
FIG. 1 depicts a flow diagram illustrating exemplary steps of a general method in accordance with the technology discussed herein.

The technology disclosed herein will now be described in reference to FIG. 1-13. FIG. 1 illustrates a general method for determining whether to assist a user manage their emails. At step 10, a user event (also referred to herein as an ":event"), triggered by a user action, is received. An email user may perform any number actions upon receiving an email message. A user may choose to open and read the email message by double-clicking on the email message. A user may chose to delete the message. A user may delete a message without even reading the message or may read the message first and then delete it. The user may chose to mark a message as "junk". The user may chose to mark the message as a phishing scam. The user may chose to move an email message from their Inbox folder to a Junk folder or any one of their personal folders. These actions are provided for exemplary purposes only, and are not intended to limit the scope of the technology described herein.

At step 12, the data associated with the user event is stored. The data associated with a user event specifies, at a minimum, information such as when the event occurred and what caused the event to occur. At the same time, at least one characteristic associated with the email is obtained (e.g., sender's email address, domain, keyword, etc.). Event data indicates that an event occurred because the user deleted an email, marked an email as junk, marked an email as a phishing scam, marked an email as not spam, the user read an email, and so on. The event data is stored to create a searchable event history. Event data may be indexed by any information contained in the email header, the email message and/or information associated with the user. In one embodiment, event data is stored in a database and is indexed by a personal ID associated with the user (e.g., WINDOWS LIVE ID) and the sender's email address. Alternatively, event data may be indexed according to other characteristics associated with the email such as, but not limited to, the sender's address, sender domain, a keyword, a topic, an email address contained in a Reply_to: field, company, registrar, type of email (e.g., newsletter, transactional, etc.), and so on.

Once an event is received, the technology determines whether to assist the user manage their email messages, at step 14. As will be discussed in more detail below, the decision whether to assist the user manage their email is determined by any number of different heuristics.

Figure 3:
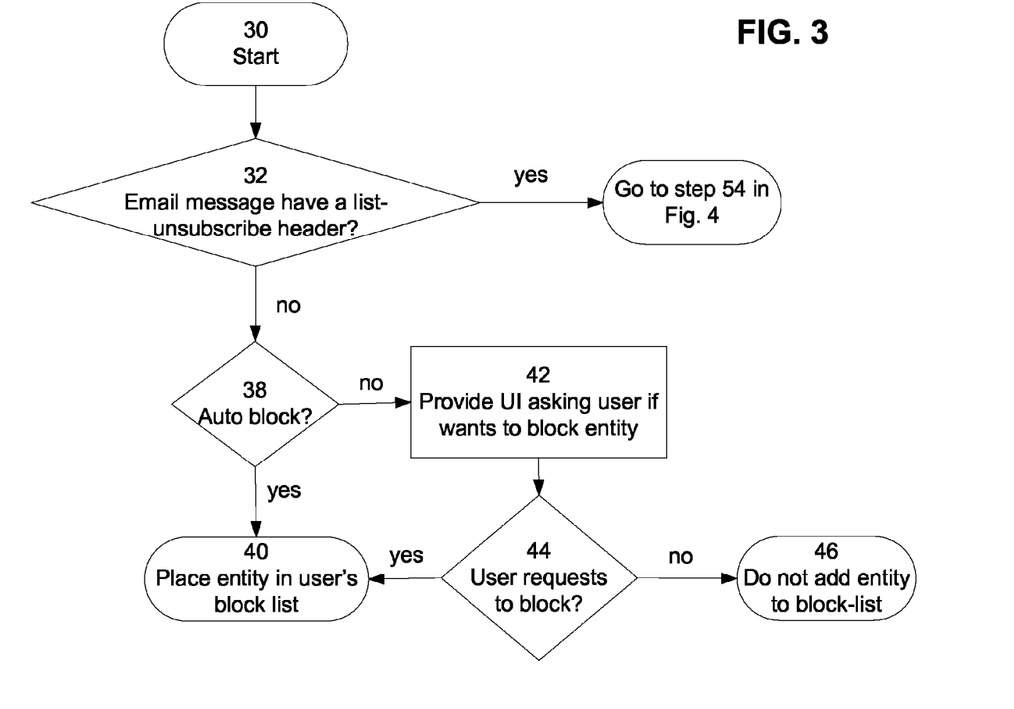
FIG. 3 depicts a flow diagram illustrating exemplary steps for assisting a user manage their email account.
Figure 4:
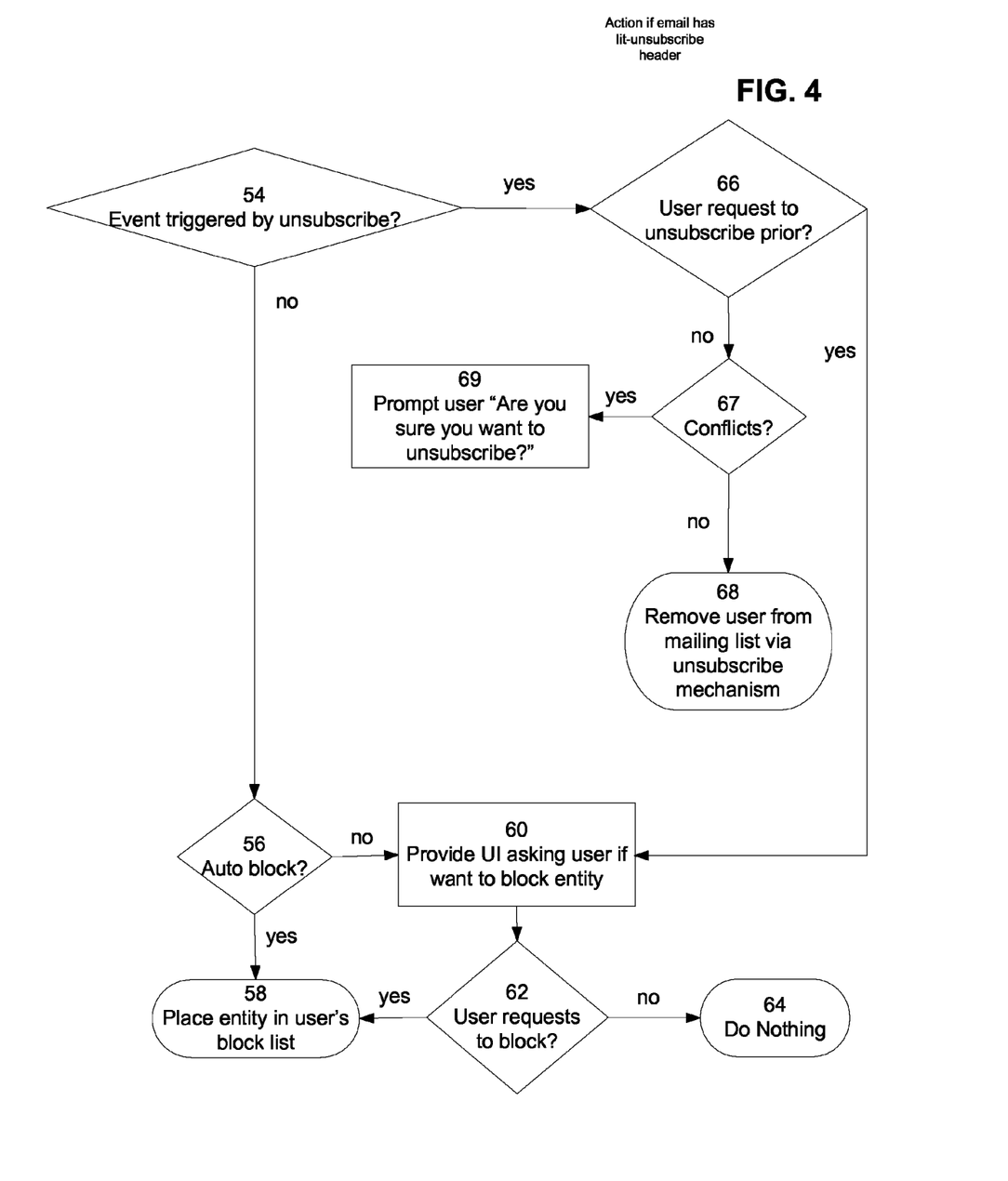
FIG. 4 depicts a flow diagram illustrating exemplary steps for assisting a user manage their email account when an event is based on a request to unsubscribe from a mailing list.

If the decision is made to assist the user manage their email, the technology determines what action to perform, at step 16. FIGS. 3-4 provide additional detail of determining an action. As will be discussed in more detail below, determining an action is based partially on the action that generated the event. Possible actions include, but are not limited to, adding a sender (or any other characteristic) to the user's block-list, unsubscribing the user from a mailing list and correcting an action performed by the user, and removing a sender from the user's safe-list.

If the heuristics decide to not assist the user manage their email, the method shown in FIG. 1 is completed at step 18. At this point, the technology listens for another event to occur. If, however, the heuristics determine to assist the user manage their email, the technology implements an action, at step 20.

Figure 2:
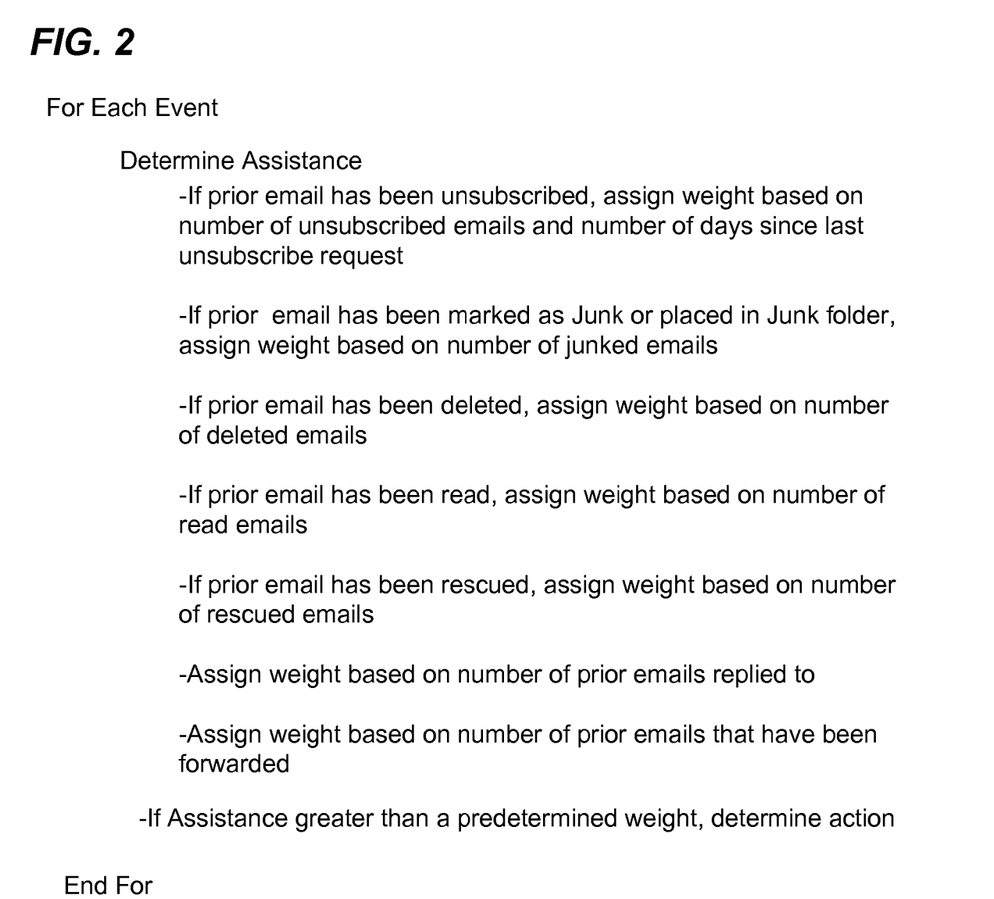
FIG. 2 depicts various heuristics used in accordance with the technology for determining whether to assist a user in managing their email account.

FIG. 2 illustrates a set of heuristics which may be utilized for determining whether to assist the user manage their email at step 14. For each event received, assistance is provided to the user (step 20 in FIG. 1) if the assistance exceeds a predetermined value. As discussed above, two actions that could be implemented on behalf of an email user include: adding a sender to the user's block-list and unsubscribing the user from a mailing list. Either action will effectively reduce the total number of email messages received by the user. Adding a sender to a block-list prevents the user from receiving future emails from the sender. Unsubscribing from a mailing list prevents a user from receiving future emails associated with the mailing list.

The heuristics shown in FIG. 2 allow the technology to analyze an event history associated with the characteristic identified in the event received at step 10. In one embodiment, the characteristic comprises the sender's email address. Alternatively, a characteristic may comprise a domain, a topic, a website, a product disclosed in the body of the message, and the like. A characteristic may also comprise any information contained in the email message header such as, but not limited to, data within a From: field, a Reply-To: field, a Return-Path: field, a Subject: field, an Internet Protocol (IP) address, and so on.

The heuristics are based on the principle that actions performed by a user indicate whether the user is interested in receiving future emails from a sender. Certain actions performed by a user indicate that the user is not interested receiving future messages from the sender. These actions include, but are not limited to, deleting a message, marking a message as junk, dragging a message into a Junk folder, marking a message as a phishing scam, unsubscribing, and the like. These actions are exemplary, and are not intended to limit the scope of the technology described herein.

Certain actions performed by a user indicate that the user is interested in receiving messages from the sender. These actions include, but are not limited to, reading an email, replying to an email, forwarding an email, marking an email as not junk, rescuing an email from a junk folder, and so on. These actions are exemplary, and are not intended to limit the scope of the technology described herein.

The heuristics shown in FIG. 2 may be implemented upon receiving a user event. Upon implementing the heuristics, a decision whether to assist the user (perform an action) may be based on any number of different criteria. As discussed above, at least one characteristic associated with the email is identified. For the purpose of describing the technology herein only, the characteristic associated with the email is the sender (e.g., email address). Thus, the criteria are measured against the same sender. By way of example only, the criteria may include whether the user has previously junked a message from the sender. This may include marking a message as Junk by selecting a "mark as Junk" button. Alternatively, the user may have dragged the message into a Junk folder.

If a prior message from the sender has been junked by the user, the number of junked emails may indicate that the user would be interested in adding the sender to their block-list. If, on the other hand, only one prior message from the sender has been junked, less weight may be afforded to this criteria.

The criteria need not be (but could be) weighted evenly. For example, actions performed by the user that are based on selecting an explicit button or link provided in the mail user interface (see FIG. 12) may be afforded the most weight. By way of example only, the explicit buttons may include a Junk button, a Mark as Button (for marking as spam or a phishing scam). The link may comprise the Unsubscribe link. The explicit buttons and the link provide the strongest indication that the user is not interested in receiving mail from the sender. In these instances, the heuristics that indicate the user is interested in received emails from the sender must be afforded strong weights to prevent the sender from being automatically added to the user's block-list. In addition, certain heuristics may assign a smaller weight to trigger an action. For example, the junk count may trigger assisting the user upon the user adding only a second email from the same sender to a Junk folder. In contrast, a delete count, by itself, may not trigger assisting a user until the delete count reaches five or more deleted email from the same sender.

Another criteria which may be applied is whether the user has previously requested to unsubscribe from a mailing list associated with the sender. If the user has previously requested to unsubscribe from a mailing list associated with the sender, the number of unsubscribe requests and the number of days between requests may indicate that the user would be interested in adding the sender to their block-list. Requesting to unsubscribe from a mailing list is afforded a higher weight than other criteria such as, for example, deleting a prior message, reading a message, and rescuing a message.

Another criteria which may be applied is whether the user has previously deleted any messages associated with the sender. If a prior email message from the sender has been deleted by the user, the number of deleted emails may indicate that the user would be interested in adding the sender to their block-list. As described above, where the email message deleted by the user is associated with a mailing list, the technology may unsubscribe the user from the mailing list as well as add the sender to the user's block-list. Deleting numerous messages from the sender provides a strong indication that the user is not interested in receiving messages from the email address. If, on the other hand, the user has only deleted one message (or a few) from the sender, less weight may be afforded to this criteria.

Another criteria which may be applied is whether the user has marked any prior emails from the sender as a phishing scam. If a prior email message from the sender has been marked as a phishing scam, the number of marked emails may indicate that the user would be interested in adding the sender to their block-list. If the email is associated with a mailing list, the technology may also unsubscribe the user from the mailing list. Marking numerous messages from a sender as a phishing scam provides a strong indication that the user would be interested in adding the sender the their block-list or unsubscribing. If, on the other hand, only one message from the sender has previously been marked by the user, less weight may be afforded to this criteria. Alternatively, the technology may add the sender to the user's block-list upon the first time the user marks an email as a phishing scam.

The heuristics also attempt to identify inconsistent patterns of actions performed by the user on emails from the sender (e.g., sender address, sender domain, etc.). An inconsistent action pattern is defined as two or more actions taken by a user on emails from a sender that are not complimentary to each other. For example, the user marks an email from a sender as junk, but reads all subsequently received emails from the sender. An inconsistent action pattern indicates that the user has not decided what to do with the sender's emails. The heuristic applies several different criteria in an attempt to identify inconsistent patterns.

One criteria that may be applied is whether the user has read any messages associated with the sender. If the user has read any messages, the number of messages read by the user may indicate that the user is interested in receiving emails from the sender. If, on the other hand, the user has not read any messages (or only read a few messages) from the sender, less weight may be afforded to the reading criteria.

If the email user read prior messages from the sender, another criteria which may be applied is the reading time of each message. The weight assigned to the message reading time modifies the weight assigned based on the number of emails read by the user. Reading a message for more than, by way of example only, thirty seconds, may indicate that the user is interested in reading emails from the sender. If, on the other hand, the reading time of each message is less than, by way of example only, five seconds, less weight may be afforded to the reading criteria. An extended reading time may also indicate that the user is not interested in reading emails from the sender.

Another criteria which may be applied is whether the user has rescued any messages from the sender that the user initially marked as junk or spam, moved the their inbox to a junk folder, and so on. If a message from the sender has been rescued by the user (e.g., removed from the Junk folder), this may be an indication that the user is interested in receiving emails from the sender.

Another criteria which may be applied is whether the user has marked any prior message from the sender as "not junk." If a prior message from the sender has been marked as not junk by the user, the number of marked emails may indicate that the user would not be interested in adding the sender to their block-list. If, on the other hand, no prior messages, or only one prior message, have previously been marked, less weight may be afforded to this criteria.

In all such cases, if the assistance factor is greater than a predetermined value, the technology will provide assistance to manage the user's email (step 20 in FIG. 1).

Once assistance data exists, it may be utilized in a number of ways. In one instance, the sender may be automatically added to the user's block-list. The sender may be added to the block-list with or without providing notification to the user. Yet another action may be to request permission from the user to add the sender to the user's block-list. Yet another action may be to request permission from the user to submit an unsubscribe request to the sender to remove the user from a mailing list.

FIGS. 3-4 illustrate exemplary steps for determining an action at step 16 and implementing a response at step 20. In FIG. 3, implementing an action begins at step 30. For the purpose of describing the technology herein only, FIGS. 3-4 will be described with reference to adding a sender to the user's block list or unsubscribing the user from a mailing list.

Figure 9:
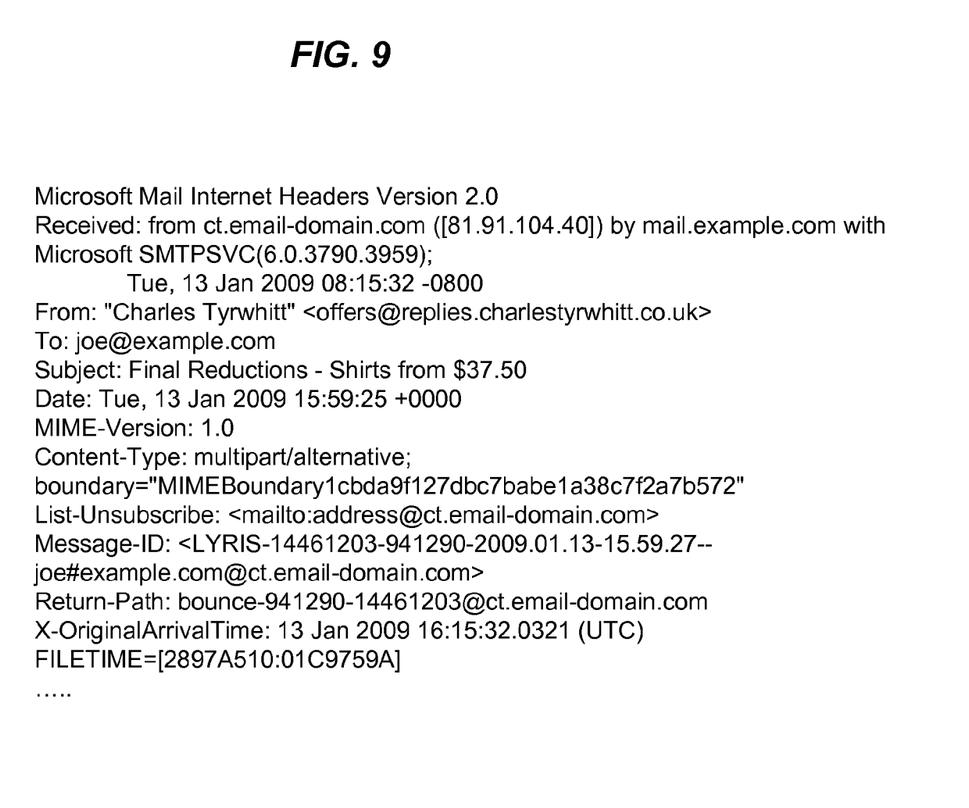
FIG. 9 depicts an exemplary email message header.

At step 32, the technology determines if the email associated with the event includes a list-unsubscribe header. A list-unsubscribe header is optional text that email publishers and marketers may include in the header portion of messages they send. A list-unsubscribe header supports both an email based (mailto) and web based (http) unsubscribe mechanism. FIG. 9 illustrates an exemplary list-unsubscribe header within an email header. In FIG. 9, the list-unsubscribe field supports an email unsubscribe mechanism (mailto: address@ct.email-domain.com) for sending requests to unsubscribe from the mailing list. If the email associated with the event includes a list-unsubscribe header, the method continues to step 34 to provide the user the option to either add the sender to the user's block-list or unsubscribe from the mailing list. If the email does not include a list-unsubscribe header, the method proceeds to step 36 to determine whether to automatically add the sender to the user's block-list or first prompt the user to get permission to add the sender to the user's block-list.

At step 34, the technology determines whether the sender should be automatically added to the user's block-list. This determination is based largely on the weights assigned by the heuristics. A strong assistance factor indicates that the user will likely not object to adding the sender to their block-list and therefore, the technology adds the sender to the user's block-list without first requesting permission from the user, at step 36. As will be described in more detail later, the user may be notified that the sender has been added to their block-list and, in one embodiment, be given the opportunity to cancel the action (adding the characteristic to the user's block-list). Neither notifying the user nor cancelling an action is required.

Referring back to FIG. 2, assistance may be determined in several ways. For instance, a user may have deleted several prior emails from the sender, marked one email from the sender as junk, and read one email from the sender. The user actions of junking email and deleting email from the sender both indicate that the user is not interested in receiving emails from the sender. Although a reading weight has been assigned because the user has read one email from the sender, the junk and delete criteria are stronger criteria and provide a better indication of the user's intentions towards the sender than reading a single email. Based on this scenario, the assistance determination likely exceeds a predetermined value, and the technology will perform assistance to the user to manage their email (e.g., in the form of adding the sender to a block-list).

If the response does not exceed the predetermined weight, the technology will not automatically add the sender to the email user's block-list. Instead, at step 38, the technology provides a pop-up window asking the email user if they would like to add the sender to their block-list.

FIG. 4 provides additional detail of the steps performed by the technology if it is determined that the email message contains a list-unsubscribe header, at step 32. In this instance, the technology could add the sender to the user's block-list or unsubscribe the user from the mailing list.

At step 54, it is determined whether the event was triggered because of an unsubscribe request. If the event was not triggered because of an unsubscribe request, the technology determines if the sender should be automatically added to the email user's block-list, at step 56. This determination is based largely on the assistance determined by the heuristics. A strong assistance indicates that the user likely favors adding the sender to their block-list. If the heuristics determine a strong assistance factor, the technology adds the sender to the email user's block-list without first requesting permission from the email user, at step 58. As will be described in more detail later, the technology may notify the user that the sender has been added to their block-list and, in one embodiment, give the user the opportunity to cancel the action. Neither is required.

If the assistance determination does not exceed the predetermined weight, the technology will not automatically add the sender to the email user's block-list. Instead, at step 60, the technology displays a pop-up window asking the email user if they would like to add the sender to their block-list. Any type of user interface to the email user requesting permission to add the sender to the user's block-list.

At step 62, the technology receives input from the email user to grant permission or deny permission to add the sender to their block-list. By selecting the "yes" button, the email user grants permission to add the sender to their block-list, and the technology proceeds to add the sender to the email user's block-list, at step 58. By selecting the "no" button, the user denies permission to add the sender to their block-list, and the technology does not add the sender to the user's block-list, at step 64.

At step 54, if the event was triggered by an unsubscribe request, the method proceeds to step 66. At step 66, it is determined whether the user has previously requested to unsubscribe from a mailing list associated with the sender. If the user has not previously unsubscribed, the technology checks for conflicts in the action history associated with the sender, at step 67. As discussed above, requesting to unsubscribe from a mailing list provides a strong indication that the user does not want to receive any further emails from the sender. Actions that conflict with unsubscribe requests include reading email, replying to email, forwarding email and marking email as not junk. For example, a conflict would exist if a user unsubscribes from a mailing list, yet reads subsequent emails received from the sender (because the sender does not honor the unsubscribe request). The unsubscribe request indicates that the user does not want to receive future emails from the sender. However, reading emails from the sender indicates that the user is interested in receiving future emails from the sender.

If the heuristics detect a conflict at step 67, a pop-up window is displayed informing the user "Are you sure you want to unsubscribe?" Other messages may be displayed to the user. Similar to the windows shown in FIGS. 7-8, a pop-up window may display a yes button and a no button to allow the user to confirm whether to submit another unsubscribe request. If a conflict is not detected at step 67, the technology allows the unsubscribe request to proceed.

Figure 5:
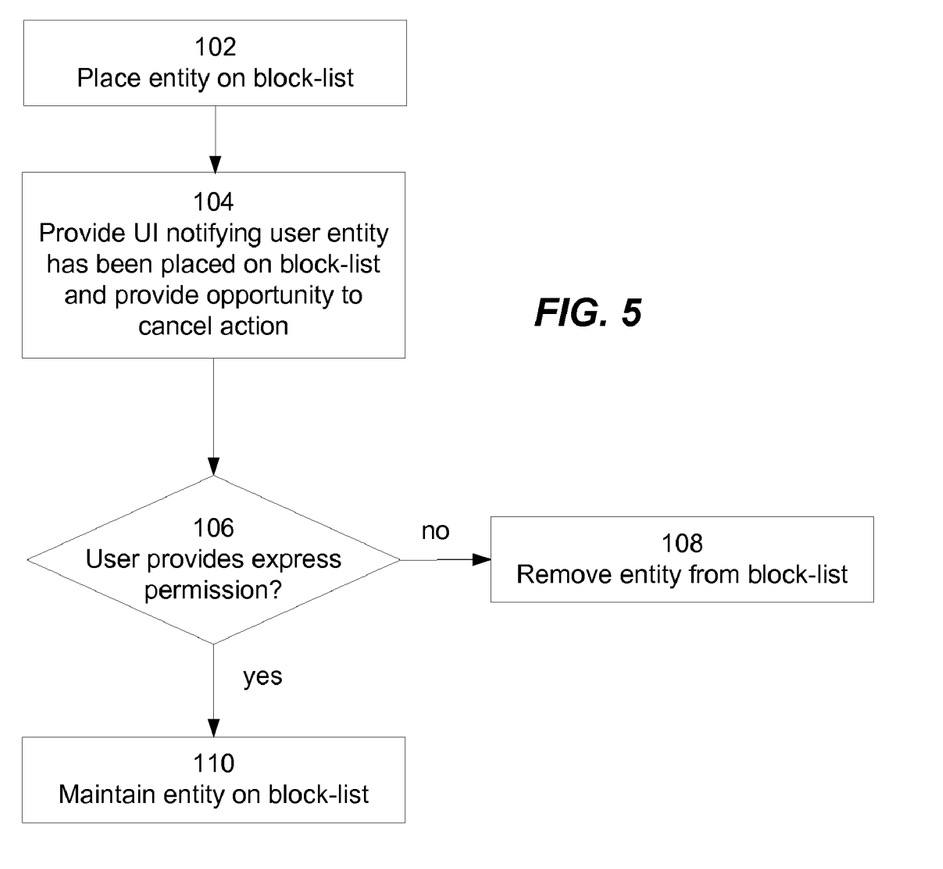
FIG. 5 depicts a flow chart illustrating exemplary steps of adding a sender to the user's block-list.
Figure 6:
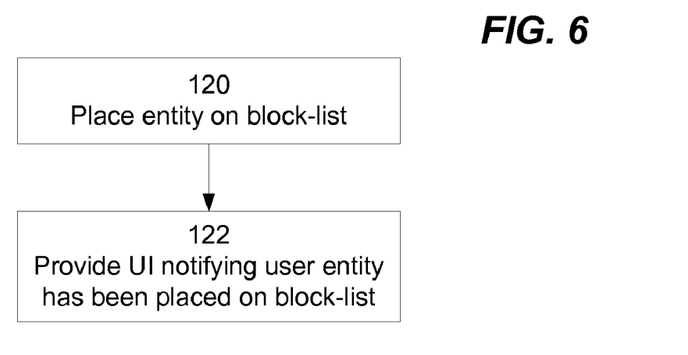
FIG. 6 depicts a flow chart illustrating another embodiment of adding a sender to the user's block-list.

FIGS. 5-6 illustrate additional detail of adding a sender to the user's block-list at step 58 in FIG. 4. At step 58, the sender has been automatically added to the user's block-list because of the strong weight assigned by the heuristic. A strong response indicates that the user will agree to adding the sender to their block-list.

In FIG. 5, a sender is added to the user's block-list, at step 102. The sender added to the user's block-list, in one embodiment, is the email address located in the From: field of the email. The user's block-list is not limited to adding email address. Other characteristics that may be added to a user's block-list include, but are not limited to, a keyword, a Reply-to: address, a domain, a company, a URL, a topic, and the like. At step 104, a UI (e.g., pop-up window) is provided notifying the user that the sender has been added to the user's block-list. The UI also provides the user the opportunity to cancel the action. Providing notification to the user that the sender has been placed on the user's block-list is not required. Similarly, it is not required to provide the user the opportunity to cancel the action. At step 106, input is received from the user. If the user does not grant permission to add the sender to their block-list, the action is effectively canceled and the sender is removed from the user's block-list, at step 108. If the user grants permission to add the sender to the their block-list, the action is completed and the sender remains on the user's block-list, at step 110.

Figure 7:
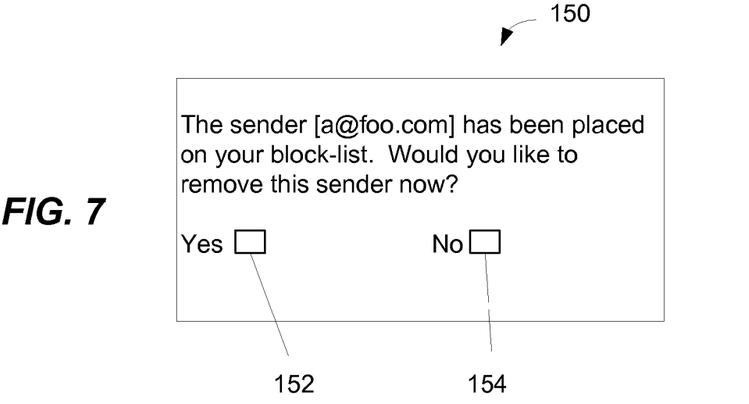
FIG. 7 depicts an exemplary dialog window prompting the user for permission to add a sender to the user's block-list.

FIG. 7 illustrates en exemplary window 150 for notifying the user that the sender of the email has been added to the user's block list. The window 150 informs the user that "The sender [a@foo.com] has been placed on your block-list." The window 150 also provides the user the option to immediately remove the sender from the block-list if the user decides the sender was placed on the block-list in error. In this embodiment, the window 150 provides a Yes button 152 and a No button 154. By selecting the Yes button 152, the sender is removed from the user's block-list, at step 108. By selecting the No button 154, the sender remains on the user's block list, at step 110.

Figure 8:
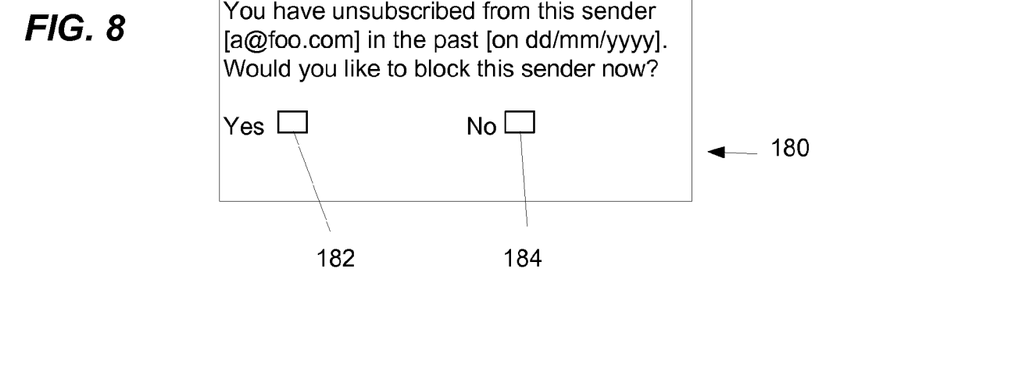
FIG. 8 depicts an exemplary dialog window providing a user the option to cancel an action taken on behalf of the user.

FIG. 8 provides another example of a pop-up notification window. Similar to the pop-up window provided at step 69, the window 180 is displayed based on the event being triggered by an unsubscribe request. In this instance, a strong unsubscribe weight would be assigned because the user has previously submitted an unsubscribe request to the sender but is still receiving emails (e.g., sender is not honoring the first unsubscribe request). The window 180 notifies that user that "You have unsubscribed from this sender [a@foo.com] before in the past. Would you like to block this sender now?" Alternatively, if the heuristics determine that the prior unsubscribe request was sent within a predetermined number of days (e.g., within 10 days), the window 180 may display the following message: "We have submitted your request to unsubscribe to [a@foo.com]. Would you like to block this sender now?" The window 180 provides a Yes button 182 and a No button 184. By selecting the Yes button 182, the sender is Added to the user's block-list. By selecting the No button 184, the sender is not added to the user's block list.

Figure 10:
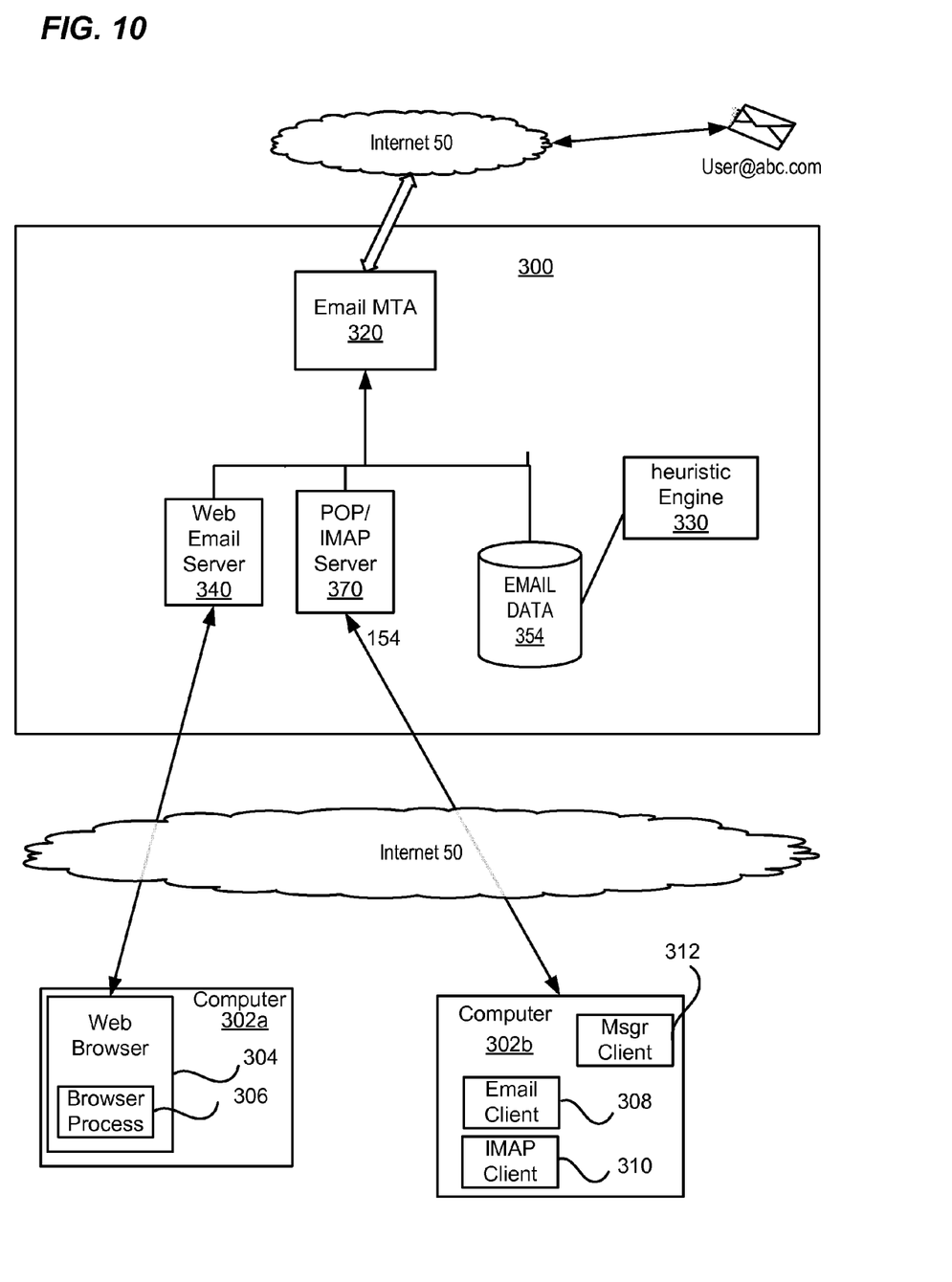
FIG. 10 depicts a first system suitable for implementing the technology discussed herein.

Various alternatives of the technology may be implemented on different systems. FIG. 10 illustrates an email system which may be provided in a web-based environment by a system administrator. An email system 300 includes an email message transfer agent (MTA) 320 which accepts and forwards e-mails provided from a LAN, WAN, or Internet from and to an email data store 354. A message transfer agent 320 receives and forwards emails for users who subscribe to system 300. Users access email data store 354 maintained by the system 300 via a number of interfaces.

An engine 330 (which may be a stand alone program or component of the data store) interacts with the email data store 354 to perform the methods discussed herein. System 300 may include a web-based email server 340 which provides a browser based user interface access to e-mail data store 354 to client's operating computers 302A utilizing a web browser and a browser process 306. A pop/IMAP server 370 may provide email access to users operating a computer 302B having, for example, an email client 308, or an IMAP client 310, and/or messenger client 312.

Figure 11:
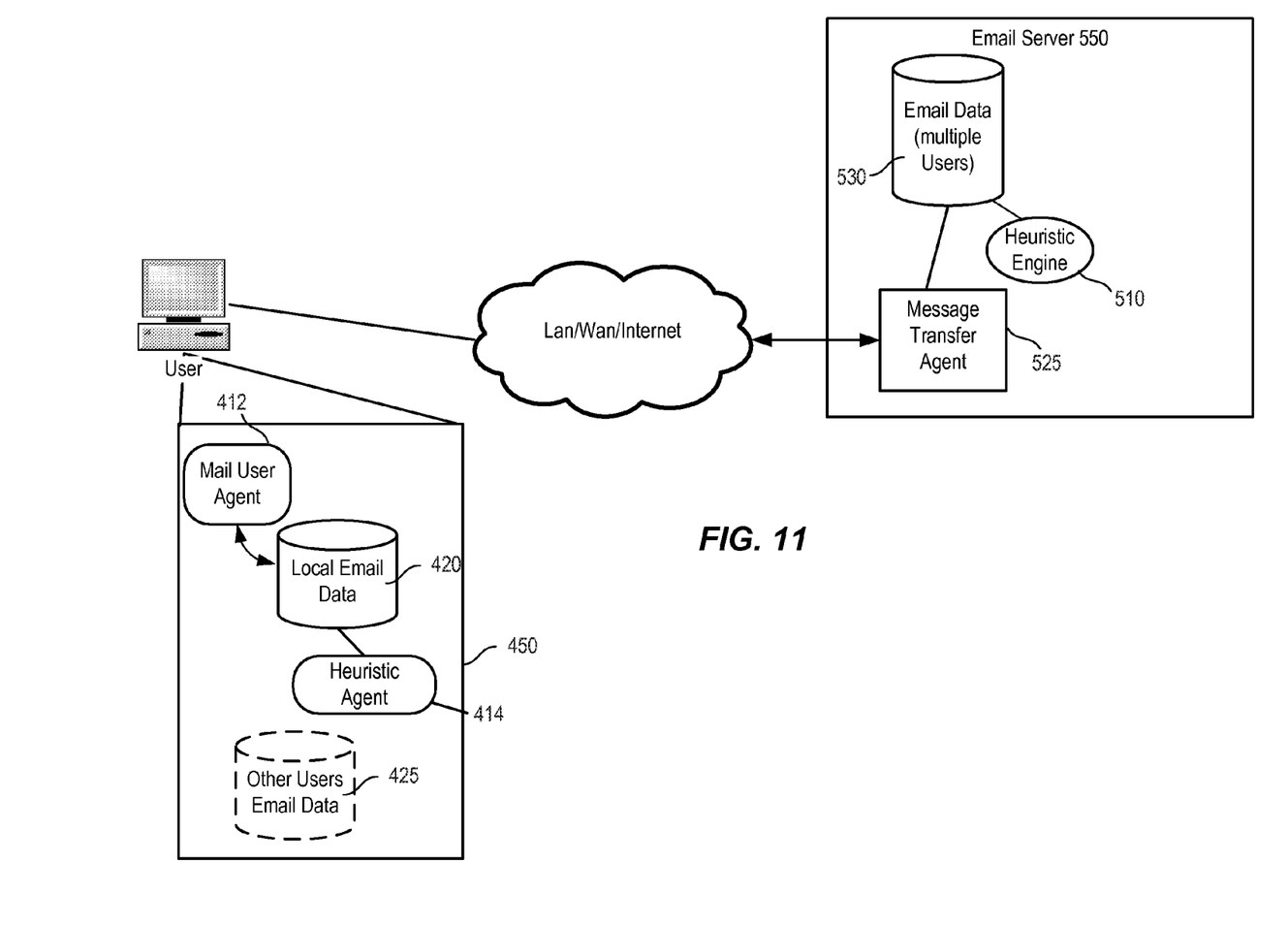
FIG. 11 depicts a second system suitable for implanting the technology discussed herein.

In another alternative, the heuristic engine may be provided on a stand alone email server 550, or a client device 450 shown in FIG. 11. Email server 550 may be an email server such as Microsoft Exchange 2003 and include an email data store 530 showing e-mail data from multiple users. Server 550 includes an MTA 525 which accepts and forwards emails provided from a LAN, WAN, or Internet. A heuristic engine 510 communicates with the data store 530 in accordance with the methods discussed herein.

Likewise, a heuristic engine 414 may be provided on a client device 450. The client device 450 may include a mail user agent 412 such as Microsoft Outlook, Eudora, or any other well-known email client, and may include a local email database 420, as well as other local email databases for other users 425. As is well known, various operating systems maintain segregation between different users, and in one embodiment, the step of determining whether to assist a user to manage their email described above with respect to step 14 may include scanning the local email of other users 425 on a local device. A response agent 414 interacts with emails derived from the mail user agent which may be accessing email server 550, or web email server 340 in FIG. 12, to provide response information at the client level on a local processing device local to the user.

Figure 12:
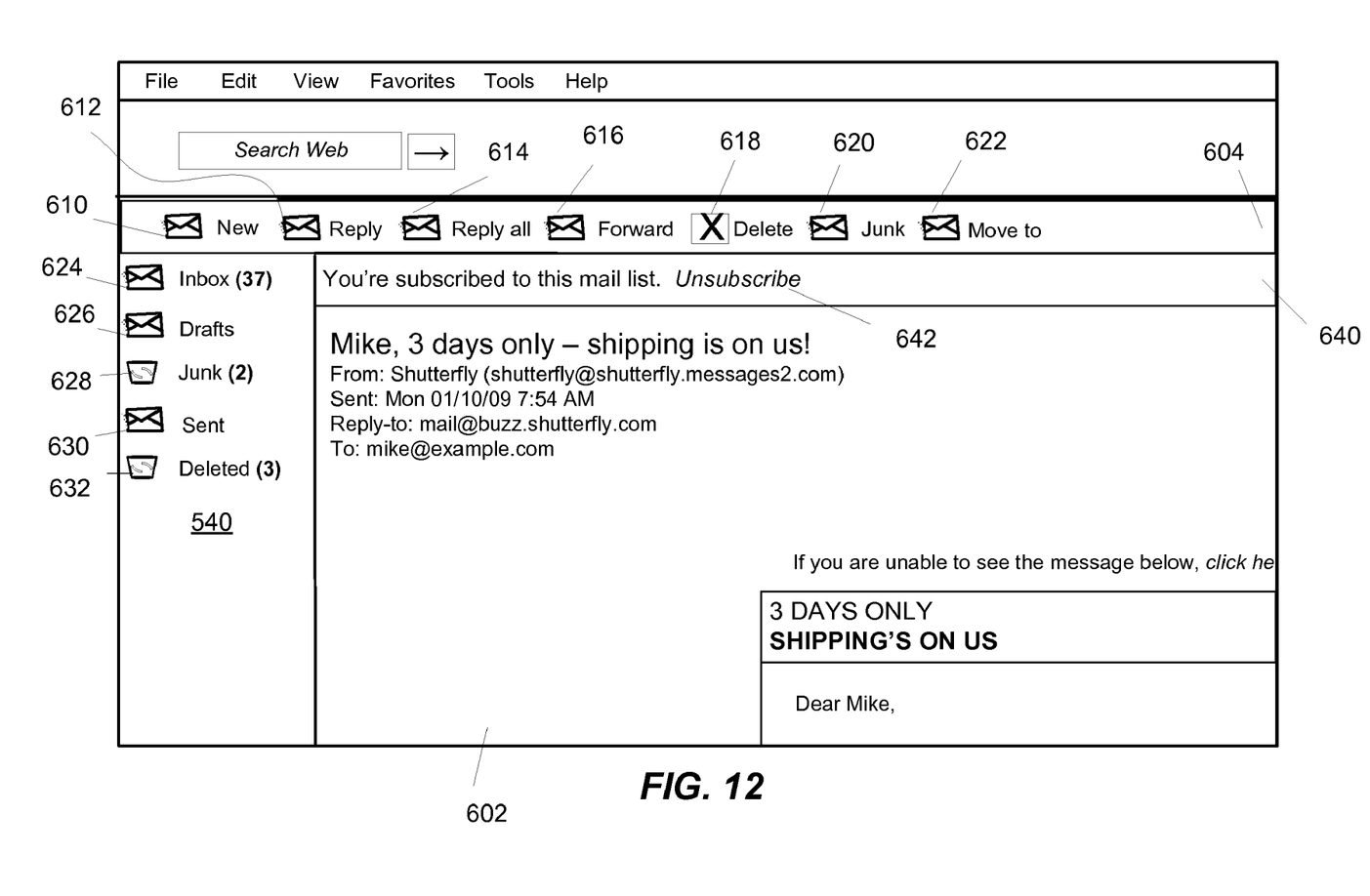
FIG. 12 depicts an exemplary email user interface.

FIG. 12 illustrates an exemplary mail user interface 600. The interface 600 includes a display window 602, toolbar 604 and a folder window 606. The display window 602 is currently displaying the content of an email opened by the user. The toolbar 604 includes several icons that a user can select to perform an action. By way of example only, the toolbar includes several buttons that a user can select, including a new message button 610, a reply button 612, a reply all button 614, a forward message button 616, a delete button 618, a junk button 620 and a move to button 622. These types of buttons provided in a toolbar are known in the art and therefore, do not require further disclosure herein. As described above, when a user selects one of the buttons 612-622 in the toolbar 604, an event is triggered and subsequently received at step 10, as described above.

The folder window 606 displays an inbox folder 624, a drafts folder 626, a junk folder 628, a sent folder 630 and a deleted folder 632. As shown in FIG. 12, the message displayed in the window 602 is an advertisement from a commercial establishment. The user likely received this email because he is on a mailing list. In the instance where the technology identifies that the email includes a list-unsubscribe header, an unsubscribe message 640 is displayed at the top of the window 602. The unsubscribe message 602 is not limited to being displayed at the top of the window, and FIG. 12 is not intended to limit the scope of the technology described herein. The unsubscribe message 640 provides a more convenient way for the user to unsubscribe from the mailing list than having to scroll through the message and locate the unsubscribe message provided by the sender of the email (which is typically at the end of the message). The user may click on the unsubscribe link 642, which triggers an event as described above.

Figure 13:
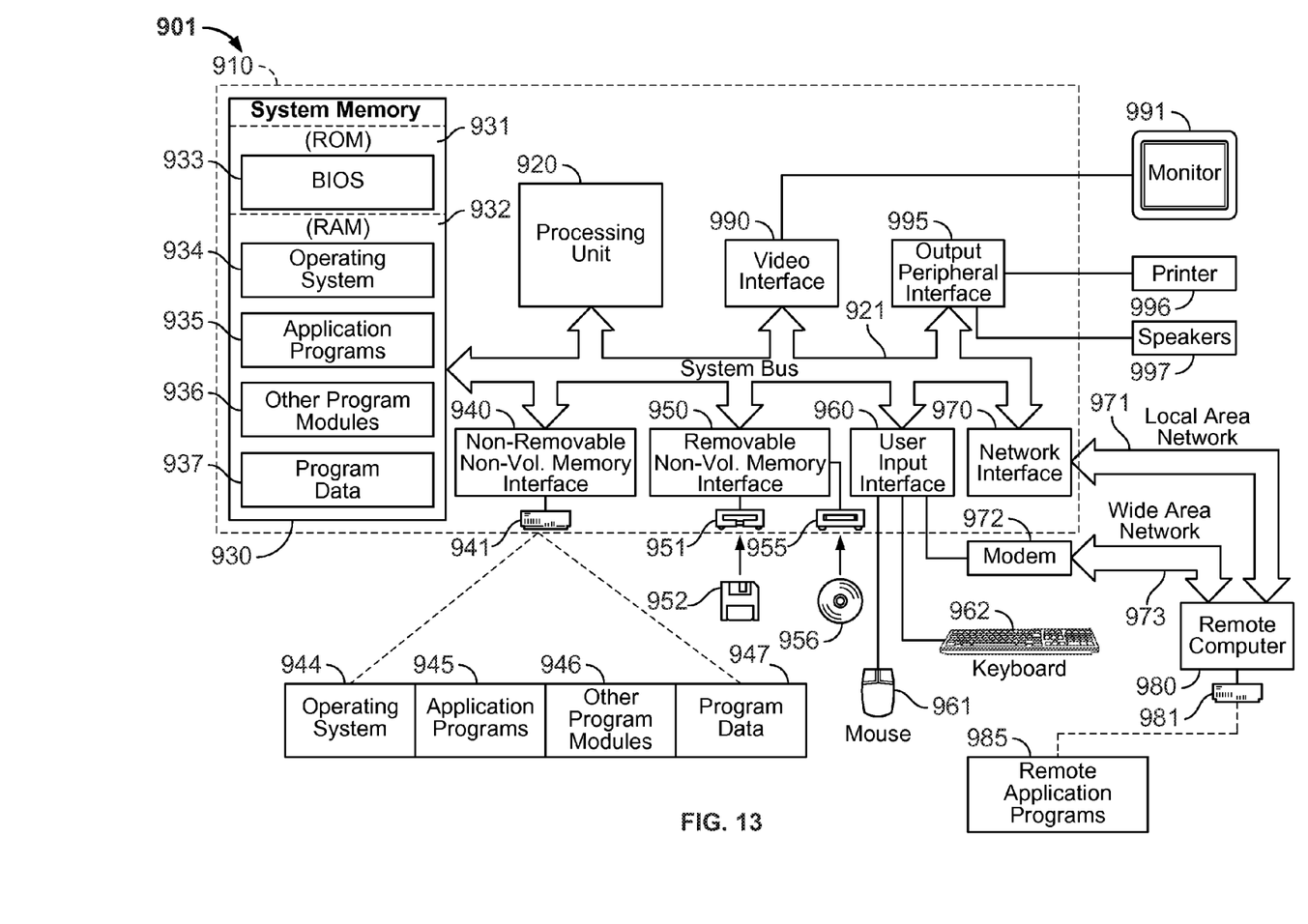
FIG. 13 depicts a processing system suitable fur use in the systems described with respect to FIG. 10 or 11.

Client device 450 and email server 550 may be a processing device such as that described with respect to FIG. 13. With reference to FIG. 13, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 13 illustrates operating system 134, application programs 135, other program modules 136, and program data 137.

The computer 110 may also include other removable/non-removable, volatile/nonvolatile computer storage media. By way of example only, FIG. 13 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 13, provide storage of computer readable instructions, data structures, program modules and other data for the computer 110. In FIG. 13, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 13. The logical connections depicted in FIG. 12 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 13 illustrates remote application programs 185 as residing on memory device 181. It will be appreciated that the network connections shown are exemplary and other means of establishing a communications link between the computers may be used.

The subject matter of the present technology is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. In addition, it is assumed that one skilled in the art is familiar with details pertaining to television signal detection, and so such details are omitted herein for purposes of clarity.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims.

We claim:

1. A method for assisting email users to manage email messages received in an email account, comprising:

receiving event data indicating a user action performed by an email user with respect to a received email message in an email account, the received email message having a characteristic;

determining whether to assist the email user manage the email account based on a heuristic comprising assigning an assistance weight to the received event data, determining an assistance factor determined based upon the assistance weight of the received event data indicating the user action performed by the email user on the received email message and one or more assistance weights of event data indicating prior user actions performed by the email user for previously received e-mails having the same value for the characteristic as the received email message; and determining whether the assistance factor satisfies a criteria with respect to a predetermined value;

responsive to the assistance factor satisfying the criteria with respect to the predetermined value, selecting to perform an action with respect to the received email message on behalf of the email user, the action comprising adding an entity of the received email message associated with the event data on a block-list associated with the email user, and implementing the action comprising adding the entity of the received email message associated with the event data on the block-list associated with the email user which further comprises adding the characteristic of the received email message associated with the event data to the block-list associated with the email user;

notifying the email user via a user interface that the characteristic has been added to the block-list associated with the email user;

providing the email user an opportunity to remove the characteristic from the block-list associated with the email user; and removing the characteristic from the block-list associated with the email user if user input from the user interface indicates the characteristic is not to be added to the block-list associated with the email user.

2. The method as recited in claim 1, wherein the characteristic associated with the received email message includes at least one of the following:

a sender's email address, a sender's domain, a keyword, a topic, an Internet Protocol address, a company, a Uniform Resource Locator, and an unsubscribe mechanism.

3. The method as recited in claim 1, wherein the step of assigning an assistance weight comprises assigning the assistance weight based on at least one of:

a number of email messages associated with the same entity that have been previously junked by the user;

a number of email messages associated with the same entity that the user has previously submitted an unsubscribe request;

a number of email messages associated with the same entity that have been previously deleted by the user;

a number of email messages associated with the same entity that have been previously rescued by the user;

a number of email messages associated with the same entity that have been previously marked as a phishing scam by the user;

a number of email messages associated with the same entity that have been replied to by the user;

a number of email messages associated with the same entity that have been forwarded by the user; or a number of email messages associated with the same entity that have been read by the user.

4. The method as recited in claim 1, wherein the step of assigning an assistance weight comprises assigning the assistance weight based on at least one of:

a number of email messages associated with the same characteristic that have been previously junked by the user;

a number of email messages associated with the same characteristic that the user has previously submitted an unsubscribe request;

a number of email messages associated with the same characteristic that have been previously deleted by the user;

a number of email messages associated with the same characteristic that have been previously rescued by the user;

a number of email messages associated with the same characteristic that have been previously marked as a phishing scam by the user;

a number of email messages associated with the same characteristic that have been replied to by the user;

a number of email messages associated with the same characteristic that have been forwarded by the user; or a number of email messages associated with the same characteristic that have been read by the user.

5. The method as recited in claim 1, wherein the step of adding the characteristic of the received email message associated with the event data to the block-list associated with the email user comprises the steps of:

providing a user interface prompting the email user for permission to add the characteristic of the received email message associated with the event data to the block-list associated with the email user; and if user input indicates permission has been granted, adding the characteristic of the received email message associated with the event data to the block-list associated with the email user.

6. One or more computer readable storage devices having stored thereon software which when executed by one or more processors cause the processor to perform a method for assisting email users in managing email messages received in their email account, the method comprising:

receiving event data indicating a user action associated with a received email message in an email account, the received email message contains data that identifies a sender of the received email message;

assigning an assistance weight to the received event data indicating the user action associated with the received email message in accordance with a heuristic;

determining that the email user is not interested in receiving future emails from the sender based on the heuristic comprising determining an assistance factor based upon one or more assistance weights assigned to event data indicating prior user actions associated with the same sender and the assistance weight assigned to the received event data indicating the user action associated with the received email message and determining that the assistance factor satisfies a criteria with respect to a predetermined value; and adding the sender of the received email message associated with the event data on a block-list associated with the email user;

notifying the email user via a user interface that the sender has been added to the block-list associated with the email user;

providing the email user an opportunity to remove the sender from the block-list associated with the email user; and removing the sender from the block-list associated with the email user if user input indicates the sender is not to be added to the block-list associated with the email user.

7. The one or more computer readable storage devices as recited in claim 6, wherein the step of assigning an assistance weight to the event data indicating the user action associated with the received email message comprises assigning the assistance weight based on at least one of:

a number of email messages associated with the sender that have been previously junked by the user;

a number of email messages associated with the sender for which the user has previously submitted an unsubscribe request;

a number of email messages associated with the sender that have been previously deleted by the user;

a number of email messages associated with the sender that have been previously rescued by the user;

a number of email messages associated with the sender that have been previously marked as a phishing scam by the user;

a number of email messages associated with the sender that have been read by the user; and if a number of email messages associated with the sender have been read by the user, an amount of time the user has spent reading each email message.

8. The one or more computer readable storage devices as recited in claim 6 further comprising implementing one or more of the following actions:

blocking the received email message;

if the email message includes a list-unsubscribe header, unsubscribing the user from a mailing list;

if the sender is listed in a safe-list associated with the user, removing the sender from the safe-list associated with the user.

9. The method as recited in claim 1, further comprising implementing one or more of the following actions:

blocking the received email message;

if the email message includes a list-unsubscribe header, unsubscribing the user from a mailing list;

if the sender is listed in a safe-list associated with the user, removing the sender from the safe-list associated with the user.

10. A system for assisting email users to manage email messages received in an email account, comprising:

one or more first computer systems comprising one or more first processors and having access to one or more first memories, the one or more first computer systems being communicatively coupled over a network to one or more second computer systems comprising one or more second processors and having access to one or more second memories, for accepting from and forwarding to emails for an email user having an email account which the one or more first processors of the one or more first computer systems manage;

the one or more first computer systems being communicatively coupled to a user interface for receiving user input and displaying data including emails;

the one or more first processors of the one or more first computer systems receiving event data from the user interface indicating a user action performed by the email user with respect to a received email message in the email account, the received email message having a characteristic;

a heuristic engine executing on the one or more first processors of the one or more first computer systems for determining whether to assist the email user manage the email account based on a heuristic which further comprises determining an assistance factor based upon one or more assistance weights assigned to event data indicating prior actions performed by the email user for previously received e-mails having the same value for the characteristic as the received email message and an assistance weight assigned to the received event data indicating the user action associated with the received email message and determining whether the assistance factor satisfies a criteria with respect to a predetermined value; and responsive to the assistance factor satisfying the criteria with respect to a predetermined value, the one or more first processors of the one or more first computer systems selecting to perform an action with respect to the received email message on behalf of the email user, the action comprising adding an entity of the received email message associated with the event data on a block-list associated with the email user and stored in the one or more first memories accessible by the one or more first computer systems which further comprises the one or more first processors of the one or more first computer systems adding the characteristic of the received email message associated with the event data to the block-list associated with the email user;

the one or more first processors of the one or more first computer systems sending one or more messages to the user interface, the one or more messages notifying the email user that the characteristic has been added to the block-list associated with the email user and indicating an opportunity to remove the characteristic from the block-list associated with the email user; and the one or more first processors of the one or more first computer systems removing the characteristic from the block-list associated with the email user if user input from the user interface indicates the characteristic is not to be added to the block-list associated with the email user.

* * * * *